United States Patent [19]

Embach

[11] Patent Number: 4,934,735
[45] Date of Patent: Jun. 19, 1990

[54] SWITCH ASSEMBLY FOR MODULAR OCCUPANT RESTRAINT SYSTEM

[75] Inventor: James T. Embach, Rochester Hills, Mich.

[73] Assignee: General Motors Corporation, Detroit, Mich.

[21] Appl. No.: 282,809

[22] Filed: Dec. 12, 1988

[51] Int. Cl.$^5$ .............................................. B60R 21/20
[52] U.S. Cl. ................................. 280/731; 200/61.54
[58] Field of Search .............. 280/734, 728, 730, 731; 200/61.54

[56] References Cited

U.S. PATENT DOCUMENTS

| | | | |
|---|---|---|---|
| 3,819,205 | 6/1974 | Dunford et al. | 280/150 AB |
| 4,289,940 | 9/1981 | Sado et al. | 200/5 A |
| 4,289,943 | 9/1981 | Sato | 200/159 B |
| 4,302,648 | 11/1981 | Sado et al. | 200/159 B |
| 4,322,983 | 4/1982 | Sado | 73/862.68 |
| 4,325,568 | 4/1982 | Clark et al. | 280/731 |
| 4,343,975 | 8/1982 | Sado | 200/314 |
| 4,348,557 | 9/1982 | Sado | 200/5 A |
| 4,390,765 | 6/1983 | Sado et al. | 200/159 B |
| 4,638,131 | 1/1987 | Kidd et al. | 200/61.55 |

Primary Examiner—Richard A. Bertsch
Attorney, Agent, or Firm—Herbert Furman

[57] ABSTRACT

A modular occupant restraint system includes a container for the inflatable cushion and cover over the container, with the cover and container having split lines which separate their upper walls into outwardly and oppositely opening upper and lower pairs of flaps to permit deployment of the inflatable cushion. A switch assembly located between either or both pairs of flaps includes one or more membrane switches located between the flaps and respective keypads projecting outwardly of the cover flap for closing respective pairs of printed circuits on the upper and lower flexible members of the membrane switch to each other. The membrane switches are each connected across a mechanism to be operated and a source of power by flat conductors which extend outwardly of the module between the cover and container, preferably across the connected sides of the flaps.

5 Claims, 3 Drawing Sheets

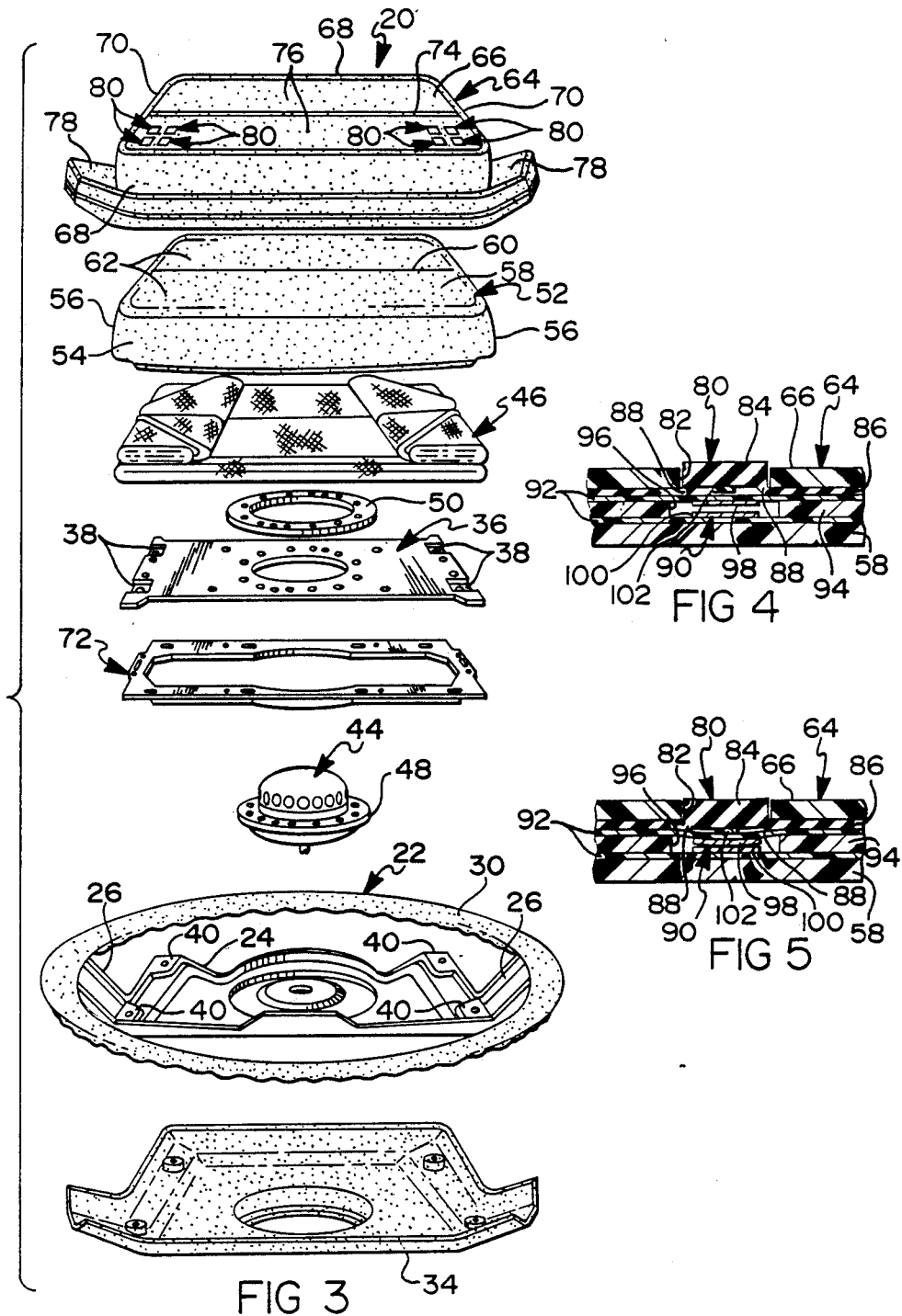

SWITCH ASSEMBLY FOR MODULAR OCCUPANT RESTRAINT SYSTEM

This invention relates generally to a switch assembly for a modular occupant restraint system and more particularly to such a switch assembly which is located in the cover of an occupant restraint system directly in the path of deployment of the inflatable cushion of such a system.

U.S. Pat. Nos. 3,819,205 Dunford et al, Modular Occupant Restraint System and 4,235,568, Clark et al, Modular Occupant Restraint System, both assigned to the assignee of this invention, show modular occupant restraint systems which include a box-like container for the folded inflatable cushion and a flexible decorative cover over the container. The upper walls of the container and cover include split lines which provide separable flaps opening outwardly and oppositely of each other along the connected side or hinge line of the flap when the cushion is inflated. Horn blowing switches are located on the spokes of the steering wheel adjacent to the end walls of the container and cover and totally outside the path of deployment of the inflatable cushion.

U.S. Pat. No. 4,638,331 Kidd et al, Steering Wheel Pad Keyboard Switch Assembly, assigned to the assignee of this invention, shows a keyboard type switch assembly mounted in the pad of al steering wheel. Such a switch assembly is of major thickness and is incompatible with inflatable restraint systems since it would interfere with inflation of the cushion.

The switch assembly of this invention is particularly intended for use with modular occupant restraint systems of the type shown in the Dunford et al and Clark et al patents. The switch assembly includes a thin membrane type switch which is located underneath the cover of the system and seats on one of the flaps defined by the split lines in the upper wall of the container. The membrane switch generally comprises a pair of flexible members separated by an intervening spacer and having printed circuits on the opposing sides thereof. The assembly further includes a thin manually depressible key pad seating on the upper flexible member and closing the printed circuits of the flexible members to each other and across a source of power and a mechanism to be operated when the key pad is manually depressed. The key pad may be integrally formed with the upper wall of the cover and include a finger depressible portion joined to such wall by flexible reduced thickness webs. The tension in the cover applied to the membrane switch through the key pad is normally sufficient to retain the membrane switch in place on the flap. Alternatively, the switch may be adhesively or otherwise secured in place. In an alternate embodiment, the key pad is formed integral with a base and joined to such base by flexible reduced thickness webs. The base seats on the membrane switch and the key pad projects through an opening in the outer wall of the cover. The tension in the cover applied to the membrane switch through the base of the key pad is normally sufficient to retain the membrane switch in place on the upper wall of the container. Alternatively, the switch may be adhesively or otherwise secured in place.

The printed circuits of the flexible members of the membrane switch are connected across a source of power and a mechanism to be operated by a flat type conductor which extends between the cover and container and outwardly of the module across the inseparable side or hinge line of the flap on which the membrane switch is mounted. Alternatively, the flat type conductor may cross a split line and have a weakened or score line where it crosses the split line so as to part when the flap separates from the upper wall of the container along the split line upon inflation of the cushion.

When the cushion is deployed, the membrane switch of either embodiment moves with the flap on which it is seated to an out of the way position and does not interfere with deployment of the cushion. Likewise, the flat type conductor does not interfere with deployment of the cushion. During normal operation of the vehicle, the switch is conveniently available to the driver.

If backlighting of the key pad is desired, this can be easily accomplished by sandwiching an electroluminescent panel between the key pad or key pad base and the membrane switch.

A number of membrane switches and key pads can be used if it is desired to operate a number of mechanisms or a number of functions of the same mechanism, such as a radio. It is preferable that the membrane switches and key pads be located adjacent the right hand and left hand sides of the cover and container since this is the most convenient location for the driver's hands and it also keeps the driver's hands away from the center of the cover and container should the cushion be deployed. One feature of this invention is that it provides a switch assembly which can be located directly in the path of deployment of an inflatable cushion of an occupant restraint system. Another feature is that the switch assembly is mounted on the housing of the cushion and moves to an out of the way position when the housing opens during deployment of the cushion. A further feature is that the switch assembly includes a membrane switch seating on the container for the cushion and a key pad for closing the membrane switch and which is mounted on the cover for the container. Yet another feature is that the membrane switch seats on an outwardly opening flap of the container which separates and swings outwardly of the container along a connected side thereof when the cushion is deployed. Yet a further feature is that a flat type conductor connects the upper and lower members of the membrane switch across a source of power and a mechanism to be operated. Still another feature is that the conductor extends outwardly between the cover and container across the connected side of the flap.

These and other features will be readily apparent from the following specification and drawing wherein:

FIG. 3 is an exploded perspective view.

FIG. 4 is an enlarged sectional view taken along line 4—4 of FIG. 1.

FIG. 5 is a view similar to FIG. 4 showing a switch assembly in closed position.

Figure 1:
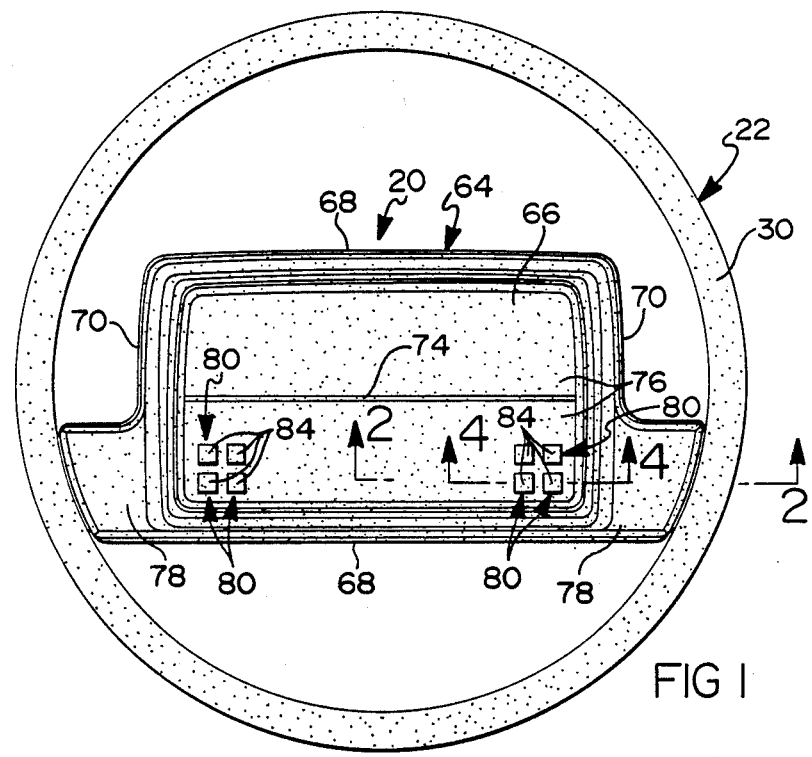
FIG. 1 is a view of an occupant restraint system embodying a switch assembly according to this invention.

Since the modular occupant restraint system shown in the drawings is substantially the same as that shown in the aforenoted Clark et al patent, only a brief description necessary for an understanding of this invention will be given. Reference may be had to Clark et al for a more detailed description.

Figure 2:
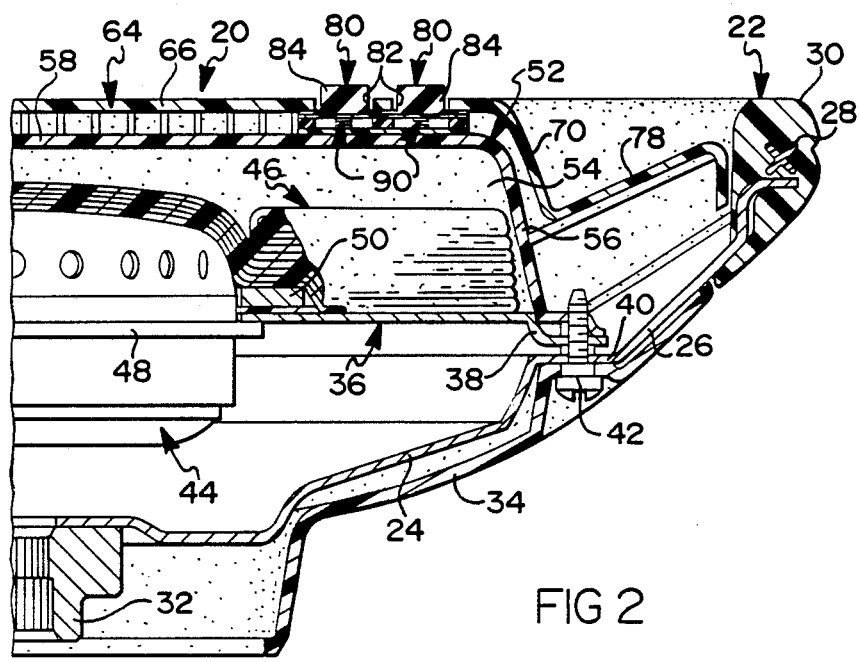
FIG. 2 is a sectional view taken along line 2—2 of FIG. 1.

Referring now to FIGS. 1 through 3 of the drawings, a modular occupant restraint system 20 is shown mounted on a vehicle steering wheel 22. The steering wheel 22 includes a hub portion 24 of rectangular dish shape and a pair of integral spokes 26 which are joined to a ring 28. The outer portions of the spokes 26 and the ring 28 are covered with molded plastic material to provide the rim 30 of the steering wheel. The hub portion 24 includes a splined bushing 32 which secures the steering wheel to the steering shaft, not shown.

A plastic shroud 34 covers the hub portion 24 and the spokes 26.

System 20 includes a support plate 36 having downwardly offset apertured tabs 38 which seat on the upper surfaces of offsets 40 of hub portion 24 and spokes 26. Screws 42 removably secure the shroud 34 and support plate 36 to the steering wheel.

System 20 includes an inflator 44 which projects through a circular aperture in the support plate 36 and into the interior of a folded inflatable occupant restraint cushion 46. A circular flange 48 of the inflator seats against the lower wall of the support plate around the aperture of the plate and a retaining ring 50 seats the lower wall of the cushion 46 against the upper wall of the support plate around the aperture of the plate. Flange 48 and retaining ring 50 are bolted to each other and to plate 36 to secure the inflator 44 and folded cushion 46 to the plate 36.

A box-like container 52 houses the folded cushion 46. The container 52 is formed of generally rigid molded plastic and the side walls 54 and end walls 56 of the container terminate in flanges which underlie the plate 36 and seat against the lower surface thereof. The upper wall 58 of the container is provided with a generally H-shaped split line 60 which divides this wall into two separable flaps 62 which open outwardly and oppositely of each other when the cushion 46 is inflated and deployed through the upper wall of the container.

An outer decorative cover 64 for the container 52 includes an upper wall 66, side walls 68 and end walls 70 which overlie and are respective to like walls of the container 52. The side and end walls of the cover terminate in flanges which underlie the flanges of like walls of the container. A retainer 72 overlies the flanges of the side and end walls of the cover and is secured to the support plate 36 through the cover and retainer flanges to clamp such flanges to the underside of the plate 36. The upper wall 66 of the cover is provided with a generally H-shaped split line 74 in alignment with split line 60 of the container so that the wall 66 is divided into flaps 76 respective to the flaps 62 of the container. The cover 64 has integral extensions 78 which cover the spokes 26 and are secured to the underside thereof.

When the inflator 44 is ignited, the resultant gas inflates the cushion 46 and deploys the cushion through the upper walls of the container 52 and cover 64 as these walls rupture along the split lines 60 and 74 and flaps 62 and 76 open outwardly and oppositely of each other.

In accordance with this invention, the restraint system 20 is provided with a number of like switch assemblies designated generally 80, FIG. 1, for control of various vehicle functions, such as radio, heater, air conditioning, etc. One embodiment of the switch assemblies 80 will now be described with reference to FIGS. 4 through 6, inclusive.

As shown in FIG. 4, the upper wall 66 of the cover 64 is provided with a series of openings 82 therethrough, each of which is respective to one of the keypads 84 and of the same general shape as such keypad although slightly larger in size. The lower edges of each keypad 84 are integrally connected to a planar base 86 by reduced thickness webs 88. Base 86 is common to all of the keypads 84 and underlies the upper wall 66 of cover 64 as shown in FIGS. 4 and 5. Also as shown in these Figures, the keypads 84 extend slightly above the outer surface of the wall 86 of cover 64 so that the driver can feel the keypads by running his or her fingers over the outer surface of the cover. A number of adjacent keypads 84 are normally formed integral with each other or ganged through base 86 for manufacturing and cost efficiency.

Figure 6:
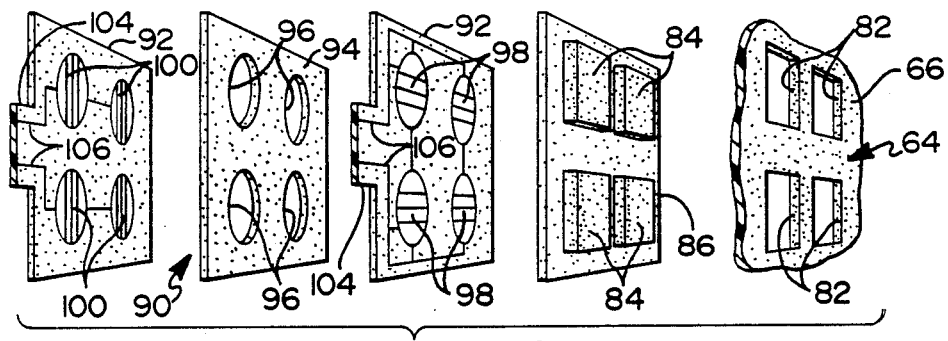
FIG. 6 is an exploded perspective view of a switch assembly.

A membrane switch assembly underlies the adjacent or ganged keypads 84. The membrane switch assembly includes a number of membrane switches 90 which are ganged or formed integral with each other for efficient manufacturing and assembly. The membrane switch assembly includes upper and lower flexible members 92 which are common to all of the membrane switches 90 and are separated by a common spacer 94. The spacer 94 has an enlarged circular opening 96 respective to each switch 90 and underlying each of the keypads 84. A number of printed circuits 98, equal in number to the switches 90, are provided on the lower side of the upper flexible member 92, and a like number of paired respective printed circuits 100 are provided on the upper side of the lower flexible member. Each pair of printed circuits provides a membrane switch 90 which is located within the confines of a respective opening 96 of spacer 94. As shown in FIG. 6, all of the printed circuits 98 are electrically connected to each other in conventional fashion, and all of the printed circuits 100 are likewise so electrically connected.

The lower flexible member 92 of the membrane switches seats on the upper wall 58 of container 52. Normally, the tension in the cover 64 is sufficient to retain the membrane switch assembly in place. However, if desired, an adhesive or other securement may be used between the base 86 and wall 66 and between the lower flexible member 92 and the upper wall 58 of the container. When the driver depresses any one of the keypads 84, a circular nubbin 102 on the lower side of the keypad engages and depresses the upper flexible member 92 against the lower flexible member, as shown in FIG. 5, to close the printed circuit 98 on the upper flexible member 92 against the printed circuit 100 on the lower flexible member 92 respective thereto and thereby close a membrane switch 90.

The printed circuits 98 and 100 of the upper and lower flexible members are connected across a mechanism to be operated and a source of power by flat conductors 104 connected to the outlet connections 106 of the printed circuits on the upper and lower flexible members 92.

The switch assemblies 90 are located generally in the corner areas of the lower flap 76 of the cover 62 of the container. This keeps the hands of the driver away from the center portion of the restraint module should the cushion be deployed while the driver's hands are over the module.

Figure 7:
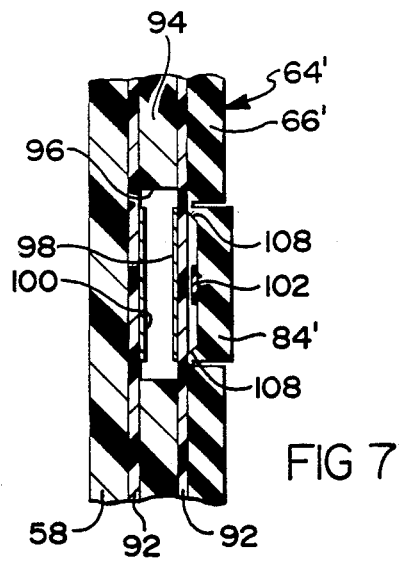
FIG. 7 is a view similar to FIG. 4 of an alternate embodiment.

FIG. 7 shows an alternate embodiment of the switch assembly which differs from that shown in FIGS. 4 through 6 in that the keypads 84' are formed integral with the upper wall 66' of cover 64' and are joined thereto by very thin integral flexible webs 108. Other than this feature, the embodiment of FIG. 7 is the same as that previously described in conjunction with FIGS. 4 through 6 and therefore like numerals have been used.

Figure 8:
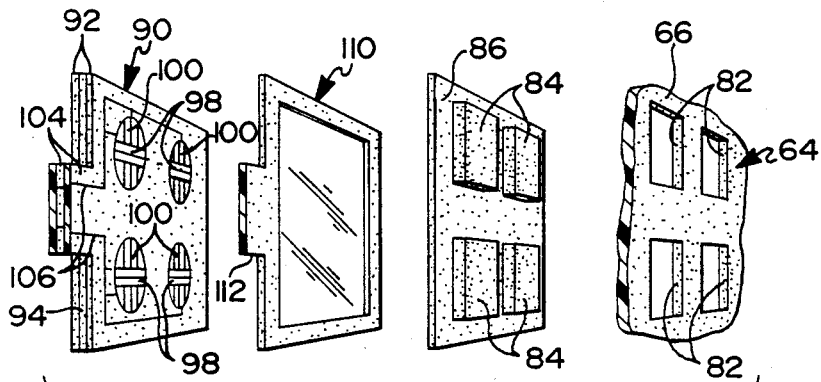
FIG. 8 is an exploded perspective view of another alternate embodiment.

In the embodiment shown in FIG. 8, an electroluminescent or backlighting panel 110 is provided underneath one or all of the keypads 84 and the upper flexible member 92 in order to backlight such keypads. The panel 110 is connected across a source of power by a flat conductor 112.

The conductors 104 and 112 extend outwardly from between the cover 64 and the container 52 across the lower connected edges of the lower flaps 62 and 76. This permits the conductors to remain intact when these flaps open outwardly and downwardly, oppositely of the upper flaps 62 and 76, when the cushion is deployed. If the switches 80 were provided in the upper half of the module, they would be located in the upper corner areas of the upper flaps 62 and 76 and the conductors 104 and 112 for such switches would extend outwardly across the upper connected edges of the upper flaps 62 and 76. It should be noted however that it is possible for either or both of the conductors 104 and 112 to be provided with predetermined tear or score lines so that such conductors can extend outwardly between the container and cover across either or both of the split lines 60 and 74 and rupture at these predetermined tear lines when the cushion is deployed. However, it is preferable that the conductors do not cross such split lines to provide for cushion deployment without interference.

Thus this invention provides an improved switch assembly for a modular occupant restraint system. The switch assembly is located directly in the path of the inflatable cushion of the system and is operable to perform or control various vehicle functions from the hub of the steering wheel while the cushion remains undeployed. The switch assembly permits deployment of the cushion without interference when such deployment occurs.

The embodiments of the invention in which an exclusive property or privilege is claimed are defined as follows:

1. In a steering wheel mounted occupant restraint system including an inflatable cushion, an inflatable cushion housing having an upper wall, a cover for the housing having an upper wall coextensive and respective to the upper wall of the housing, the upper wall of the housing and the upper wall of the cover each having a like pair of flaps, each flap being connected along one side thereof to a respective upper wall and separable along the other sides thereof from such upper wall for opening movement outwardly of such upper wall upon deployment of the cushion through such upper wall, the flaps of the housing upper wall and the cover upper wall being generally coextensive and respective to each other to provide flap units which open in generally unitary fashion upon deployment of the cushion, the improvement comprising, a switch assembly mounted to at least one of the flap units and movable with such flap unit when the unit opens outwardly upon deployment of the cushion, the switch assembly including, a membrane switch located between the flap of the housing upper wall and the cover upper wall and including upper and lower spaced flexible switch members, a key pad including a finger engageable portion housed within the cover flap and a pressure applying portion overlying the upper flexible switch member, and a flexible generally flat conductor member connected across the upper and lower switch members and extending therefrom outwardly between the upper wall of the housing and upper wall of the cover for connection across a source of power and a mechanism to be operated when the finger engageable portion of the switch assembly is depressed to engage the flexible switch members to each other.

2. The combination recited in claim 1 wherein the conductor member extends outwardly across the connected sides of the flaps for movement with the keypad and membrane switch when the flaps open outwardly on deployment of the cushion.

3. In a steering wheel mounted occupant restraint system including an inflatable cushion, an inflatable cushion housing having an upper wall, a cover for the housing having an upper wall coextensive and respective to the upper wall of the housing, the upper wall of the housing and the upper wall of the cover each having a like pair of flaps, each flap being connected along one side thereof to a respective upper wall and separable along the other sides thereof from such upper wall for opening movement outwardly of such upper wall upon deployment of the cushion through such upper wall, the flaps of the housing upper wall and the cover upper wall being generally coextensive and respective to each other to provide flap units which open in generally unitary fashion upon deployment of the cushion, the improvement comprising, a switch assembly mounted to at least one of the flap units and movable with such flap unit when the unit opens outwardly upon deployment of the cushion, the switch assembly including, a membrane switch located between the flap of the housing upper wall and the cover upper wall and including upper and lower spaced flexible switch members, a key pad including a base seating on the upper flexible switch member underneath the cover flap and a finger engageable portion integrally connected to the base and including a pressure applying portion overlying the upper flexible switch member, the cover flap including an opening of the same general shape as the keypad and receiving the keypad therethrough, and a flexible generally flat conductor member connected across the upper and lower switch members and extending therefrom outwardly between the upper wall of the housing and upper wall of the cover for connection across a source of power and a mechanism to be operated when the finger engageable portion of the switch assembly is depressed to engage the flexible switch members to each other.

4. The combination recited in claim 2 including an electroluminescent panel underlying the base for backlighting the finger engageable portion of the keypad, and a flexible generally flat conductor member connected to the electroluminescent panel and extending outwardly therefrom for connection to a source of power.

5. In a steering wheel mounted occupant restraint system including an inflatable cushion, an inflatable cushion housing having an upper wall, a cover for the housing having an upper wall coextensive and respective to the upper wall of the housing, the upper wall of the housing and the upper wall of the cover being divided into multisided flaps connected along one side thereof to a respective upper wall and separable along the other sides thereof from such upper wall for opening movement outwardly of such upper wall upon deployment of the cushion through such upper wall, the flaps of the housing upper wall and the cover upper wall being generally coextensive and respective to each other and paired to provide flap units which open together as a unit upon deployment of the cushion, the improvement comprising, a switch assembly mounted to at least one of the flap units and movable with such flap unit when the unit opens outwardly upon deployment of the cushion, the switch assembly including, a membrane switch located between the paired flaps of the housing upper wall and the cover upper wall and including upper and lower spaced flexible switch members, each having a printed circuit closable to the other, a key pad including a finger engageable portion overlying the upper flexible switch member and connected to the cover upper wall by thin flexible webs so as to be depressible independently of such upper wall to close the upper printed circuit to the lower printed circuit, and a flexible generally flat conductor member connected across the printed circuits of the upper and lower switch members and extending therefrom outwardly between the upper wall of the housing and upper wall of the cover for connection across a source of power and a mechanism to be operated when the finger engageable portion of the switch assembly is depressed to close the printed circuits of the flexible switch members to each other.

* * * * *